United States Patent [19]
Cornell

[11] Patent Number: 5,658,210
[45] Date of Patent: Aug. 19, 1997

[54] METHOD AND APPARATUS FOR RANKING GOLF DRIVES

[76] Inventor: Douglas W. Cornell, 10 Derby Rd., Port Washington, N.Y. 11050

[21] Appl. No.: 596,949

[22] Filed: Feb. 5, 1996

[51] Int. Cl.$^6$ ............................................. A63B 57/00
[52] U.S. Cl. ........................................................ 473/407
[58] Field of Search ................................. 473/405, 407, 473/409, 131; 434/252

[56] References Cited

U.S. PATENT DOCUMENTS

| | | | |
|---|---|---|---|
| 4,703,444 | 10/1987 | Storms, Jr. et al. | 473/407 |
| 4,783,071 | 11/1988 | Tattershall | 473/407 |
| 5,214,679 | 5/1993 | Metcalf | 473/407 |
| 5,298,904 | 3/1994 | Olich | 342/42 |
| 5,326,095 | 7/1994 | Dudley | 473/407 |
| 5,364,093 | 11/1994 | Huston et al. | 473/407 |
| 5,434,789 | 7/1995 | Fraker et al. | 473/407 |
| 5,438,518 | 8/1995 | Bianco et al. | 473/407 |

*Primary Examiner*—Jessica Harrison
*Attorney, Agent, or Firm*—Collard & Roe, P.C.

[57] ABSTRACT

A scoring system for use on a golf course hole having a tee and a pin for ranking measured distances from a golf ball for each of several golfers playing the hole. The scoring system includes a transmitting station having an input device for entering a distance, for each golfer, from the corresponding golf ball to a particular location on the hole and a receiving station located adjacent the tee having a display device. The most favorable distance along with the name of the corresponding golfer is transmitted from the transmitting station and displayed on said display device. A method for ranking measured distances from a golf ball for each of several golfers playing a hole having a tee and a pin is also disclosed. The method includes the steps of determining a distance from a driven golf ball to a particular location, entering the distance and the name of the golfer into an input device of a transmitting station, transmitting distance and golfer information to a receiving/displaying station located adjacent the tee. The most favorable distance along with the golfer is displayed on the receiving/displaying station. The steps are repeated for each golfer so that the most favorable distance is updated following each drive.

13 Claims, 2 Drawing Sheets

METHOD AND APPARATUS FOR RANKING GOLF DRIVES

CROSS REFERENCE TO RELATED DOCUMENTS

This application relates to Disclosure Document No. 385,384 filed on Oct. 20, 1995.

BACKGROUND OF THE INVENTION

1. Field of the Invention

The invention relates to a method and apparatus for ranking golf drives. More particularly, the golf drive which is most favorably ranked is transmitted and displayed adjacent the tee to inform subsequent players of the distance to beat.

2. The Prior Art

Golfers are typically assisted in planning play and in keeping score by the use of a score card which lists the yardage, par value and the handicap for each hole in a golf course and also provides a place for the golfer to enter the number of strokes taken in a hole by each player in a group after play of the hole is completed. Some score cards also include a miniature map of the course that may indicate doglegs, water hazards, bunkers, and areas that are out of bounds. However, if the golfer is not at the tee or the green, the score card cannot tell him where he is and how far he has to go to reach the pin. More importantly, subsequent players at the tee have no way to rank the performance of the other players who teed off previously, since balls driven from the tee typically travel a very long distance of up to one to two hundred yards or farther.

Distance indicators for use on a golf course are known, for example from U.S. Pat. No. 5,214,679. While this patent is useful for measuring and recording distances, the tally or scoring is only made after all the golfers complete an individual hole. Another distance measuring system is disclosed in U.S. Pat. No. 5,298,904. This patent utilizes RF transmission to electronically determine the distance from a driven ball to the pin. However, this information is only utilized by the golfers who have already teed off. The information is not transmitted to the tee for use by players who are about to tee off. In addition to scoring and determining distances of drives, it would be desirable to increase competition based on the tee off drive alone.

SUMMARY OF THE INVENTION

It is therefore an object of the present invention to provide a method and apparatus for ranking golf drives.

It is a further object of the present invention to provide a method and apparatus for displaying the most favorably-ranked golf drive at the tee.

These and other related objects are achieved according to the invention by a scoring system for use on a golf course hole having a tee and a pin for ranking measured distances from a golf ball for each of several golfers playing the hole. The scoring system comprises a transmitting station having an input device for entering a distance, for each golfer, from the corresponding golf ball to a particular location on the hole, and a receiving station located adjacent the tee and having a display device. The most favorable distance along with the name of the corresponding golfer is transmitted from the transmitting station and displayed on the display device. The particular location is the tee and the most favorable distance is the longest distance of the golfer's drive. Alternatively, the particular location is the pin, and the most favorable distance is the shortest distance between the pin and the ball. The transmitting station comprises a memory device and a microprocessor coupled to the input device and the memory device. The distance for each golf ball and the corresponding golfer is stored in the memory device so that a comparison between distances is conducted by the microprocessor to update the most favorable distance following each new entry. The transmitting station also comprises a measuring wheel coupled to the microprocessor. The transmitting station is rolled on the measuring wheel to traverse the distance from each ball so that the distance for each golf ball is measured and a corresponding electrical signal is transmitted to the microprocessor for storage in the memory device.

A method for ranking measured distances from a golf ball for each of several golfers playing a hole having a tee and a pin is also disclosed. The method comprises the steps of determining or measuring a distance from a driven golf ball to a particular location, entering the distance and the name of the golfer into an input device of a transmitting station, transmitting distance and golfer information to a receiving/displaying station located adjacent the tee and displaying the most favorable distance along with the golfer on the receiving/displaying station. These steps are repeated for each golfer so that the most favorable distance is updated following each drive. The measured distance is the distance between the driven golf ball and the tee and the most favorable distance is the longest distance. Alternatively, the measured distance is the distance between the driven golf ball and the pin, and the most favorable distance is the shortest distance. The distance and golfer information is stored so that a comparison between distances is conducted following each drive to update the displayed information. The transmitting station has a measuring wheel coupled thereto, the transmitting station is rolled on the measuring wheel to traverse the distance from each ball to the particular location so that the distance for each golf ball is measured and a corresponding electrical signal is stored. The distance and golfer information is transmitted by wireless RF transmission. The distance information may also be electronically determined by RF transmission between the transmitting station, positioned adjacent the ball, and the receiving/displaying station.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
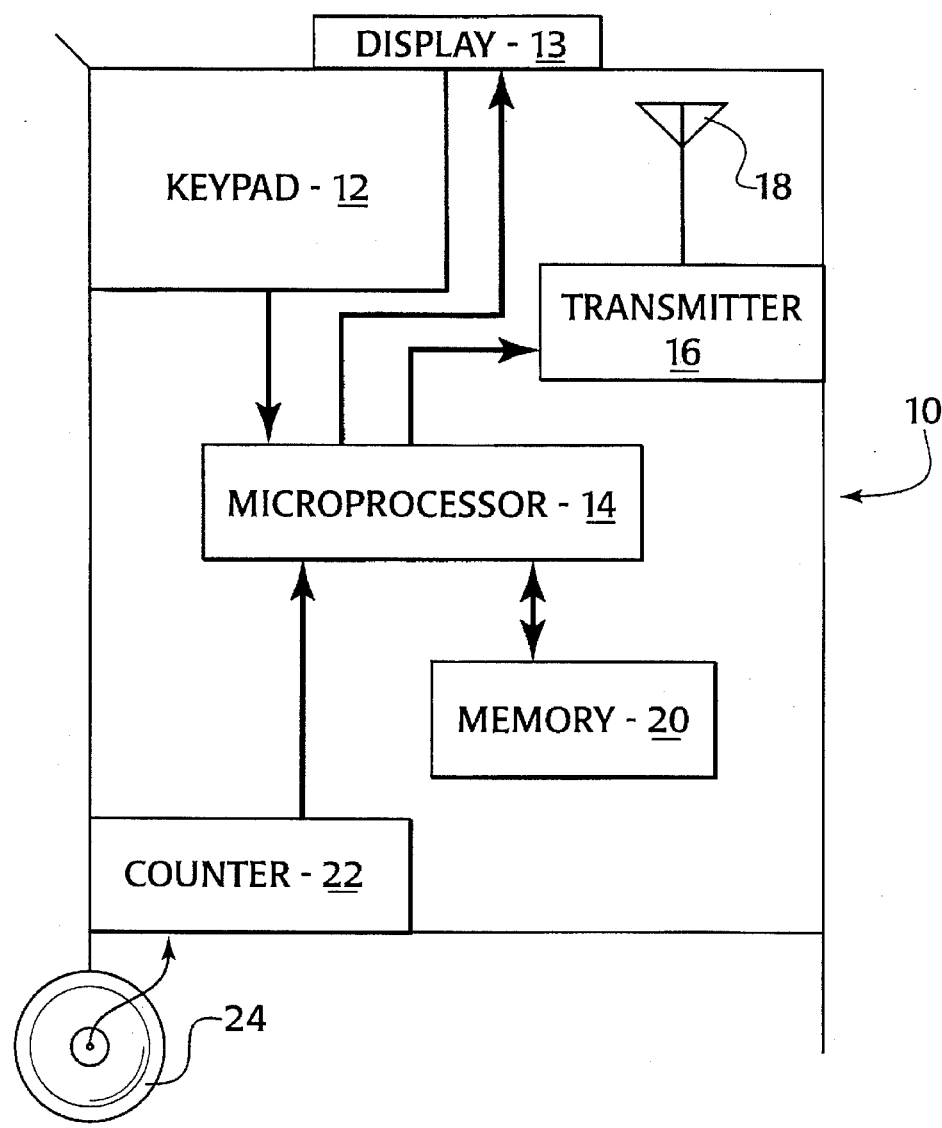
FIG. 1 is a schematic drawing of a transmitting station according to the invention.

Referring now in detail to the drawings and in particular FIG. 1 there is shown a transmitting station 10 having an input device or keypad 12, a display 13 and a memory device 20, all coupled to a microprocessor 14. A transmitter 16 is coupled between microprocessor 14 and a transmitting antenna 18. Transmitter 16 utilizes RF transmission or any other suitable type of wireless transmission. Transmitting station 10 is optionally equipped with a measuring wheel 24, which is coupled to a counter 22. Counter 22 is a transducer which produces an electrical signal corresponding to the distance traversed by measuring wheel 24. The electrical signal representing the distance is then directly communicated to microprocessor 14.

Figure 2:
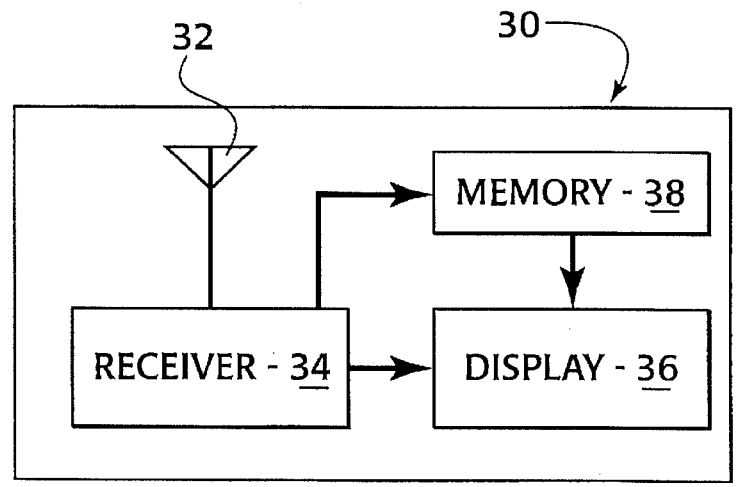
FIG. 2 is a schematic drawing of a receiving/displaying station according to the invention.

FIG. 2 shows a receiving/displaying station 30 having a receiving antenna 32 connected to a receiver 34. A memory 38 and a display 36 are connected to receiver 34. Transmitting station 10 and receiving station 30 form a matched pair which are tuned to the same frequency to define a scoring system. One such scoring system may be provided for each hole on a golf course. Since numerous systems may be in operation within operative RF distance from each other, each system is assigned a unique frequency within the RF range.

Figure 4:
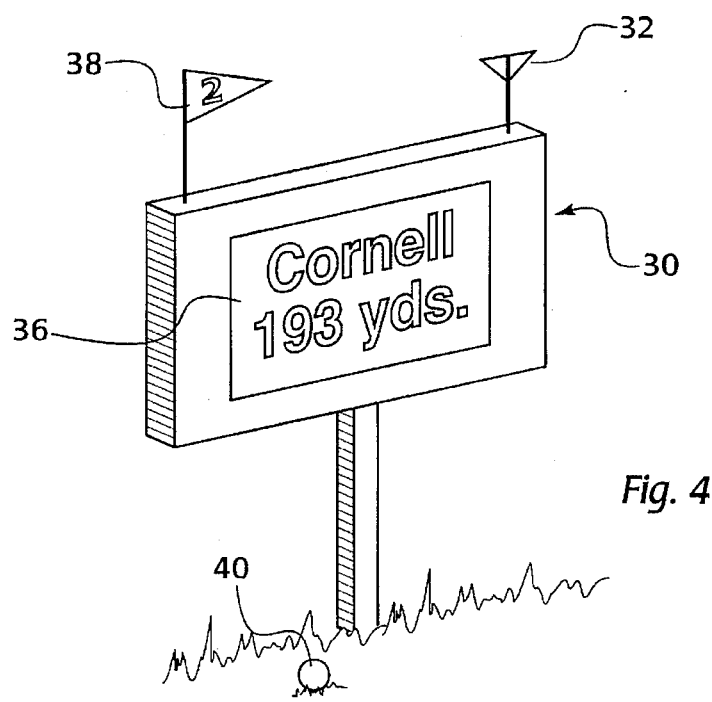
FIG. 4 is a front side elevational view of an embodiment of a receiving/displaying station.

In use, receiving station 30 is mounted adjacent a tee 40 for a particular hole, as shown in FIG. 4. Transmitting station 10 is then located along the fairway for holes with a par 4 or greater. Alternatively, transmitting station 10 is located on or near the green for holes having a par 3 or less. The distance between the ball and the pin is determined either by separate measuring techniques or by traversing the distance with measuring wheel 24. The golfer's name associated with that distance is then entered into keypad 12. After the information relating to the first golfer is entered, that information becomes ranking number 1 since no other data is available. Microprocessor 14 stores this information in memory 20 and also communicates the information to transmitter 16. The name and corresponding distance is transmitted to receiving station 30 where it is shown on display 36. Following the drive by the second golfer, the name and distance information is entered into transmitting station 10 in a similar manner. Once two or more data sets are entered into memory 20, microprocessor 14 ranks the data sets. When measuring from the ball to the pin, the shortest distance gets the highest ranking. Following the entry of each new data set, microprocessor 14 performs a ranking and then transmits the most favorably ranked data set for display on receiving station 30.

On the higher par holes, transmitter 10 is located along the fairway. In this instance, each data set consists of the golfer's name and the distance the ball was driven from the tee. The distance can be measured with a separate measuring device or with measuring wheel 24. Microprocessor 14 now ranks the distances, with the longest distance being ranked first. The top-ranked data set is transmitted and shown on display 36.

Figure 3A:
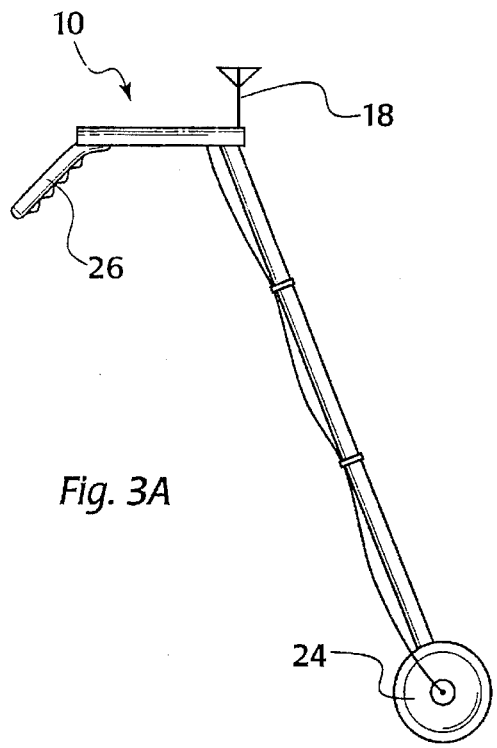
FIG. 3A is a side elevational view of an embodiment of the transmitting station.
Figure 3B:
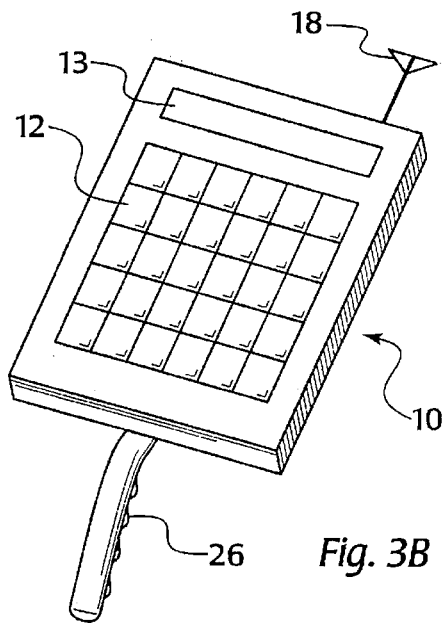
FIG. 3B is a top plan view of the transmitting station.

As can be seen in FIGS. 3A and 3B, transmitting station 10 is a hand-held electronic device mounted to a wheeled counter having a handle 26. The distance from the ball to the tee or the distance from the ball to the pin is measured by grasping handle 26 and rolling counter wheel 24 to traverse the desired distance. This distance is communicated to microprocessor 14 and stored in memory 20. The distance is additionally shown on a display 13, where the microprocessor prompts for entry of the golfer's name corresponding with that distance. The name is typed in on keypad 12. In instances where a separate measuring device is used, the distances will also be entered in on keypad 12. After the distances are ranked, the most favorably-ranked data set is transmitted to receiving station 30 for display, as shown in FIG. 4. In an alternate embodiment all data sets are transmitted and displayed in ranked order. In addition, all data sets could be transmitted and stored within another memory device 38 located within receiving station 30. On the longer par hole, display 36 would indicate the longest drive, for example, by showing "Cornell —193 yards." The next golfer teeing off from tee 40 immediately knows that they would have to have a drive of at least 193 yards to become the top-ranked player.

The distance from the tee to the ball can also be measured electronically, as disclosed in U.S. Pat. No. 5,298,904, the content of which is incorporated herein by reference thereto. After teeing off, the golfer takes transmitter 10 and holds it adjacent or proximate to the driven ball. The golfer then faces receiving station 30, which is equipped with a flag marker 38 for easy identification. Transmitting station 10 is then instructed to measure the distance between transmitting station 10 and receiving station 30. Transmitting station 10 then prompts the golfers to enter their name. The golfer's names and distances are stored and ranked with the longest distance being displayed on receiving station 30 at the tee. While this embodiment performs a distance measure as disclosed in the '904 patent, it then ranks and displays the information at the tee, which is neither shown nor contemplated by the '904 patent.

On the lower par holes, the shortest distance to the pin is given the most favorable ranking. Such a display would read "Cornell—18 inches", for example. The next golfer teeing off immediately knows that they must be within 18 inches of the pin in order to become the top-ranked player. In this manner, competition is provided based on the tee-off drive alone. This can greatly add to the excitement of the game where previously the smallest increment of competition was the number of strokes per hole.

Accordingly, while several embodiments of the present invention have been shown and described, it is obvious that many changes and modifications may be made thereunto without departing from the spirit and scope of the invention.

What is claimed is:

1. A scoring system for use on a golf course hole having a tee and a pin for ranking measured distances from a golf ball for each of several golfers. playing the hole comprising:

a transmitting station having an input device for entering a distance, for each golfer, from the corresponding golf ball to a particular location on the hole; and a receiving station located adjacent the tee and having a display device, wherein the most favorable distance along with the name of the corresponding golfer is transmitted from said transmitting station and displayed on said display device.

2. The scoring system according to claim 1, wherein the particular location is the tee and the most favorable distance is the longest distance of the golfer's drive.

3. The scoring system according to claim 1, wherein the particular location is the pin, and the most favorable distance is the shortest distance between the pin and the ball.

4. The scoring system according to claim 1, wherein said transmitting station comprises a memory device and a microprocessor coupled to said input device and said memory device, wherein the distance for each golf ball and the corresponding golfer is stored in said memory device so that a comparison between distances is conducted by said microprocessor to update the most favorable distance following each new entry.

5. The scoring system according to claim 4, wherein said transmitting station comprises a measuring wheel coupled to said microprocessor, said transmitting station is rolled on said measuring wheel to traverse the distance from each ball so that the distance for each golf ball is measured and a corresponding electrical signal is transmitted to said microprocessor for storage in said memory device.

6. The scoring system according to claim 5, wherein said transmitting station is an RF transmitting station and said receiving station is an RF receiving station.

7. A method for ranking measured distances from a golf ball for each of several golfers playing a hole having a tee and a pin comprising the steps of:

(a) determining a distance from a driven golf ball to a particular location;

(b) entering the distance and the name of the golfer into an input device of a transmitting station;

(c) transmitting distance and golfer information to a receiving/displaying station located adjacent the tee;

(d) displaying the most favorable distance along with the golfer on the receiving/displaying station; and (e) repeating steps (a) through (d) for each golfer so that the most favorable distance is updated following each drive.

8. The method according to claim 7, wherein the measured distance is the distance between the driven golf ball and the tee, and the most favorable distance is the longest distance.

9. The method according to claim 7, wherein the measured distance is the distance between the driven golf ball and the pin, and the most favorable distance is the shortest distance.

10. The method according to claim 7, wherein the distance and golfer information is stored in a memory device so that a comparison between distances is conducted following each drive to update the displayed information.

11. The method according to claim 10, wherein said transmitting station has a measuring wheel coupled thereto, said transmitting station is rolled on said measuring wheel to traverse the distance from each ball to the particular location so that the distance for each golf ball is measured and a corresponding electrical signal is stored in said memory device.

12. The method according to claim 11, wherein the distance and golfer information is transmitted by wireless RF transmission.

13. The method according to claim 8, wherein the distance between the driven golf ball and the tee is measured by positioning said transmitting station proximate the driven golf ball and transmitting an RF signal between said transmitting station and said receiving/displaying station.

* * * * *